United States Patent
Ayers et al.

(10) Patent No.: US 12,022,421 B2
(45) Date of Patent: Jun. 25, 2024

(54) OPTIMIZED DEREGISTRATION INTERWORKING

(71) Applicant: HEWLETT PACKARD ENTERPRISE DEVELOPMENT LP, Houston, TX (US)

(72) Inventors: John I. Ayers, Omaha, NE (US); Lu Tian, Plano, TX (US); Anh Tran, Plano, TX (US); David C. Williamson, Plano, TX (US); Michael R. Kelly, Plano, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 371 days.

(21) Appl. No.: 17/547,892

(22) Filed: Dec. 10, 2021

(65) Prior Publication Data

US 2023/0189194 A1   Jun. 15, 2023

(51) Int. Cl.
*H04W 60/06*   (2009.01)
*H04W 36/14*   (2009.01)
*H04W 60/00*   (2009.01)

(52) U.S. Cl.
CPC .......... *H04W 60/06* (2013.01); *H04W 36/14* (2013.01); *H04W 60/005* (2013.01)

(58) Field of Classification Search
CPC .... H04W 60/06; H04W 36/14; H04W 60/005
See application file for complete search history.

(56) References Cited

FOREIGN PATENT DOCUMENTS

WO    WO-2018158729 A1 *  9/2018

* cited by examiner

*Primary Examiner* — Marisol Figueroa
(74) *Attorney, Agent, or Firm* — Sheppard Mullin Richter & Hampton LLP

(57) ABSTRACT

5G provides for interworking with the 4G/LTE networks, which provides for mobility of user equipment between the 5G and 4G/LTE networks. Mobility from 5G to 4G/LTE requires deregistering user equipment from the 5G core network (5GC) by communicating a deregistration notification from the Evolved Packet Core (EPC) to the 5GC. Systems and methods disclosed herein provide for an optimized deregistration process through avoidance of redundant deregistration notification traffic injected into the 5G network by utilizing 4G/LTE connectivity information to determine whether or not to inject deregistration notifications into the 5G network.

20 Claims, 5 Drawing Sheets

OPTIMIZED DEREGISTRATION INTERWORKING

BACKGROUND

Wireless devices (e.g., smart phones, tablets, and laptops) are used to send and receive data. Such data may be transmitted and received over a wireless network. The 5th Generation (5G) is a standard promulgated by the International Telecommunication Union (ITU) and the 3rd Generation Partnership Project (3GPP), with the ITU setting the minimum requirements for 5G compliance, and the 3GPP creating the corresponding specifications. 5G is a successor to the 4G/Long Term Evolution (LTE) standard, and refers to the fifth generation of wireless broadband technology for digital cellular networks. 5G is intended to replace or augment 4G/LTE. Touted advantages of 5G include, e.g., exponentially faster data download and upload speeds, along with much-reduced latency (also referred to as "air latency," e.g., the time it takes for a device to communicate with the network).

The frequency spectrum of 5G includes three bands. The first band can be referred to as the low-band spectrum, i.e., the sub-1 GHz spectrum. This low-band spectrum is the primary band used by U.S. wireless carriers with data speeds reaching about 100 Mbps. The second band can be referred to as the mid-band spectrum, i.e., the sub-6 GHz spectrum, which provides lower latency (e.g., 4-5 ms) and greater data speeds (e.g., up to 1 Gbps) relative to the low-band spectrum. However, mid-band signals are not able to penetrate structures, such as buildings, as effectively as low-band signals. The third band can be referred to as the high-band spectrum, or millimeter wave (mmWave), and operates between 25 GHz and 100 GHz. The term millimeter is associated with this high-band spectrum because wavelengths in this portion of the spectrum range from, e.g., 1-10 mm. Devices operating on this third band can deliver the highest data speed (e.g., up to 10 Gbps) and the lowest latency (e.g., 1 ms). However, its coverage area (the distance it can transfer data) is less than that of the low-band and mid-band spectrums, due in part to poor building penetration. Use of mmWave technology may however, avoid already congested portions of the spectrum. So long as the limited coverage area is acceptable, the benefits of mmWave technology can still be realized.

5G coverage to provide services to users from any physical location requires deployment of 5G cells that provide full coverage. However, currently 5G has been partially deployed, resulting in coverage holes. Thus, 5G provides for interworking with the existing 4G/LTE networks that enables user equipment (UE) mobility between 5G and 4G/LTE networks as UEs move into and out of 5G coverage areas.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
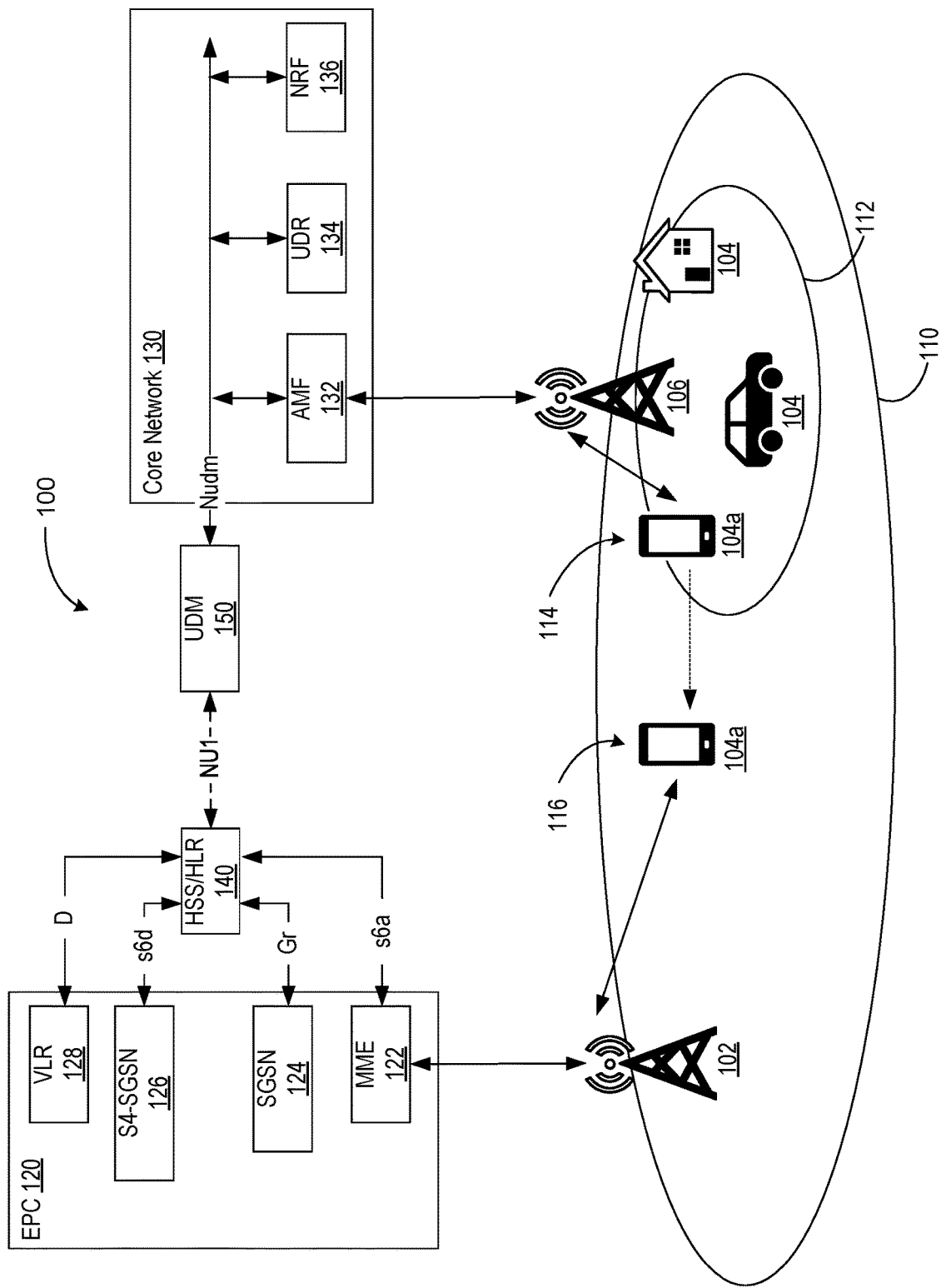
FIG. 1 illustrates an example cellular communication system.

The figures are not exhaustive and do not limit the present disclosure to the precise form disclosed.

DETAILED DESCRIPTION

A mobile network can be thought of as comprising two component networks, the radio access network (RAN) and the core network. In 5G cellular networking systems these components are a 5G access network (5G-AN) and a 5G core network (5GC) and in 4G/LTE cellular networking systems these components are radio access network (RAN) and an Evolved Packet Core Network (EPC). The 5GC may include various virtualized network functions (NFs), including, for example, Core Access and Mobility Management Function (AMF) in communication with a Unified Data Manager (UDM). The AMF is configured to handle connection and mobility management tasks. The UDM is configured to manage user authentication, authorization, and device registration on the 5GC. The EPC may include its own NFs, including, for example, a Mobility Management Entity (MME) in communication with a Home Subscriber Server (HSS). The MME provides connection management functionality between UEs and the EPC. NFs may be implemented as one or more network devices or apparatuses.

As noted above, 5G provides for interworking with the existing 4G/LTE networks providing, among other functionality, for mobility of UEs between the 5GC and the EPC. 5G and 4G/LTE are generally mutually exclusive, such that a UE may not be attached to the EPC and the 5GC at the same time (except where the networking function of the EPC is set for dual registration). In case that the networks are mutually exclusive, the 4G/LTE does not have access to 5GC attachment status of the UEs on attached to the EPC. Accordingly, in the case of migration of services from the 5GC to the EPC, the EPC must notify the 5GC that a UE is attached to the EPC and instruct the 5GC to deregister the UE and cancel 5G services. For example, when a UE attempts to attach to the EPC, the MME serving the UE initiates a registration call flow to attach the UE to the EPC for 4G/LTE services. This call flow includes, among other functions and operations, requesting registration with the EPC. Responsive to the registration request, the MME issues an Updated Location Request (ULR) to the HSS, which may then inject a deregistration notification message into the 5GC. The deregistration notification message is provided to the UDM and delivered to the AMF. The AMF then deregisters the UE from the 5G cellular network, thereby cancelling 5G services rendered thereto.

As a UE moves about the 4G/LTE network, the UE is attached to different MMEs and legacy mobility management devices (e.g., Serving General Packet Radio Service (GPRS) Support Node (SGSN), Visitor Location Register (VLR), etc.). Although current 5G and 4G/LTE network systems provide for the above mobility therebetween, the current systems generate deregistration notification messages corresponding to each attachment within the 4G/LTE. The result is that numerous, redundant deregistration notification messages are injected into 5G network traffic, regardless of the UEs attachment status with the 5GC. For example, a UE may register with an MME, resulting in a first, initial deregistration notification message injected into the 5G network, which causes the AMF to deregister the UE. Subsequently, the UE may attempt to attach to another MME or one or of a Serving GPRS Support Node (SGSN), S4-SGSN, Visitor Location Register (VLR), resulting in a subsequent one or more deregistration notification messages that are each injected into the 5G network. Each deregistration notification may be redundant for deregistering the UE from the 5GC, since the EU was already deregistered. The redundant deregistration notification traffic exhausts computation resources and CPU cycle burn at the 5G to process and respond thereto according to the 5G standards, that could otherwise be used for distributing IP services to the UEs.

Accordingly, implementations disclosed herein provide for systems and methods that optimize the deregistration of UEs from the 5GC, through reduction and avoidance of these repetitive deregistration notifications. Implementations disclosed herein utilize connectivity information with a first cellular network (e.g., such as UE attachment status on the EPC and registration settings of the EPC) to determine whether or not to inject deregistration notification message traffic into a second cellular network (e.g., 5G) for deregistration of the UE from the second cellular network. Connectivity information may include at least an attachment status with the EPC. If the attachment status indicates that no prior attachment with the EPC exists, then a deregistration notification message may be injected into the 5G network. Whereas, if a prior attachment does exist, then a deregistration notification may not be injected into the 5G network. For example, in some scenarios, attachment on the EPC may exist that permits attachment to both the EPC and 5GC (e.g., dual registration), and a deregistration notification may be injected into the 5G network. Whereas, if the existing attachment does not provide for dual attachment to the EPC and 5GC, then the deregistration notification is not injected into the 5G network. In some embodiments, the EPC does not generate a deregistration message. Accordingly, the systems and method disclosed herein optimize the deregistration of UE from the 5GC by avoiding unnecessary traffic generation, reduces CPU cycle burn, and avoids burdening the 5GC via reduction and elimination of redundant message requests. Additionally, the systems and methods disclosed herein avoid burdening the EPC via reduction of redundant message requests. By reducing burdens to the 5GC and/or the EPC, response times can be improved and latency reduced.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Before describing the details of the various implementations disclosed herein, it would be beneficial to describe an example cellular network to which the aforementioned a UE may connect. FIG. 1 illustrates an example cellular communication system 100 in which or with which various implementations of the present disclosure may be implemented. The cellular communications system may comprise multiple cellular includes a plurality of base stations or cells (e.g., base stations 102 and 106), devices 104, an Evolved Packet Core (EPC) 120, and another core network 130 (e.g., a 5GC). The base stations 102 may include macrocells (high power cellular base station) and/or small cells (low power cellular base station).

In the illustrative example of FIG. 1, base station 102 is configured according to 4G/LTE standards and interfaces with the EPC 120 through an S1 interface. Base station 106 is configured according to 5G standards and interfaces with core network 130 through an N1/N2 interface. The base stations 102 and 106 may wirelessly communicate with one or more UEs 104. Each of the base stations 102 and 106 may provide communication coverage for a respective geographic coverage area 110 and 112, respectively. There may be overlapping geographic coverage areas. For example, the base station 102 may have a coverage area 110 that overlaps the coverage area 112 of one or more other base stations, such as base station 106 as shown.

While a single base station 102 (e.g., a 4G/LTE configured base station) and a single base station 106 (e.g., a 5G configured base station) are illustrated, the cellular communication systems disclosed herein are not limited thereto. One or more base stations 102 and/or one or more base stations 106 may be provided. For example, a plurality of base stations 102 may be provided, each having a respective coverage area 110. One or more of the respective coverage areas 110 may overlap. Similarly, a plurality of base stations 106 may be provided, each having a respective coverage area 112. One or more of the respective coverage areas 112 may overlap. Furthermore, one or more of coverage areas 110 may overlap with one or more coverage areas 112.

Base stations 102 and 106 may include an eNB, gNodeB (gNB), or another type of base station. Some base stations, such as base station 106, may operate in the frequency spectrum of 5G, including the low-band spectrum, i.e., the sub-1 GHz spectrum; the mid-band spectrum, i.e., the sub-6 GHz spectrum; and/or the high-band spectrum, e.g., millimeter wave (mmWave) that operates between 25 GHz and 100 GHz.

The EPC 120 includes various network function entities, including, for example but not limited to, one or more Mobility Management Entity (MME) 122, a Serving Gateway (S-GW) (not shown), a Packet Data Network (PDN) Gateway (not shown), among other network function entities. Each MME 122 may be in communication with a Home Subscriber Server (HSS) 140 over a designated interface, for example, a s6a interface used for exchange of authentication, location, and server information about subscribers between the HSS 140 and MME 122. Each MME 122 may function as a control node that processes signaling between the UEs 104 and the EPC 120, including providing bearer and connection management functionality. The Packet Data Network (PDN) Gateway may be connected to IP Services, such as the Internet, an intranet, an IP Multimedia Subsystem (IMS), a Packet-Switched (PS) Streaming Service, and/or other IP services.

The NFs of the EPC 120 may be implemented as computing systems, such as one or more servers. The NFs of the EPC 120 may communicate using protocols, such as the Diameter Protocol and/or Mobile Application Part (MAP) of the SS7 protocol. For example, the Diameter Protocol may be used for messages between the MME and the HSS or an S4-SGSN and the HSS, while MAP may be used for messages between a Home Location Repository (HLR) and a SGSN or VLR. Data included in the messages on the EPC may be formatted according to American Standard Code for Information Interchange (ASCII) protocols.

The core network 130 may include various virtualized network functions (NFs), including, for example but not limited to, an Authentication Server Function (AUSF) (not shown), Core Access and Mobility Management Function (AMF) 132, a policy control function (PCF) (not shown), a session management function (SMF) (not shown), and a Unified Data Repository (UDR) 134, Network Repository Function (NRF) 136, to name a few. The AMF 132 is the control node that processes the signaling between the UEs 104, via base station 106, and the core network 130. The AMF 132 may receive connection and mobility management tasks from UEs 104, and can handle connection and mobility management tasks, while forwarding session management tasks/messages to a Session Management Function (SMF). The AMF 132 may be in communication with a UDM 150 over a service-based interface (SBI) for the UDM, such as a Nudm interface. The core network 130 may also include a NRF 136, which provides for network function service registration, authorization, and discovery, and otherwise enables network functions to identity one another. EPC 130 may also include a User Plane Function (UPF) (not shown) that is connected to IP Services, which may include the Internet, an intranet, an IMS, a PS Streaming Service, and/or other IP services.

The NFs of the core network 130 may be implemented as computing systems, such as one or more servers. The NFs of the core network 130 may communicate using protocols, such as HyperText Transfer Protocol (HTTP). Communications and operations may be sent, for example, using HTTP methods, such as POST, PATCH, GET, PUT, etc.

As noted above, the AMF 132 may receive connection and session-related information from UEs across N1/N2 reference point interfaces (between UE and AMF/between RAN and AMF), but may handle connection and mobility management tasks. That is, an AMF instance may be specified by a UE, e.g., UE 104, in a Non-Access Stratum (NAS) message that is routed to the AMF instance by the RAN. Performing the role of an access point to the 5G core network (terminating the RAN control plane and UE traffic), the AMF instance may authenticate the UE and manage, e.g., handovers, for the UE between access points, base stations, and gNBs.

The 150 provides services to other functions of the Service-Based Architecture (SBA), such as the AMF 132 and other network functions. The UDM 150 may store information in local memory. The UDM 150 may also store information externally, for example, within the UDR 134. The UDM 150 may provide authentication credentials while being employed by the AMF 132 to retrieve subscriber data and access registration context data.

Although the preceding description may provide examples based on 5GC and 4G/LTE it should be appreciated that the concepts described therein may be applicable to other communication technologies. For example, the concepts described herein may be applicable to legacy networks, such as, GPRS, CDMA, GSM, and/or other wireless technologies in which a UE may operate. For example, the EPC may include network functions of the legacy networks. GPRS core networks included a SGSN configured to perform functions similar to the MME 122. The EPC 120 may include or be communicably coupled to a SGSN 124 that communicates with the HSS 140 via a designated interface, such as, a Gr interface for routing information between the SGSN 124 and the HSS/HLR 140. In some GPRS core networks, an S4-SGSN is used for performing functions similar to MME 122. The EPC 120 may include or be communicably coupled to a S4-SGSN 126 that communicates with the HSS 140 via a designated interface, such as, a s6d interface used for exchange of authentication, location, and server information about subscribers between the HSS 140 and S4-SGSN 126. GSM core networks include a Visitor Location Register (VLR) configured to perform functions similar to the MME 122 and a HLR performing functions similar to the HSS 140. The EPC 120 may include or be communicably coupled to a VLR 128 that communicates with the HSS 140 via a designated interface, such as a D interface used for routing information between a VLR 128 and the HSS/HLR 140. The term "mobility management device" (or MMD) will be used herein to refer to one or more of an MME, SGSN, S4-SGSN, VLR, or similar network function entity included in the EPC, while "legacy mobility management device" will be used herein to refer to one or more of SGSN, S4-SGSN, VLR and the like. Additionally, "location and service information interface" may be used to refer to one or more of the s6a, s6d, D, Gr, or similar interfaces between the HSS and a respective mobility management device.

The base stations 102 and/or 106 provide an access point to the EPC 120 or core network 130 for a UE 104. Examples of UEs 104 include cellular phones, a smart phones, laptop computers, tablet computers, personal computers, vehicle-implemented communication devices (e.g., vehicles having vehicle-to-vehicle (V2V) capabilities), multimedia devices, game consoles, wearable devices, or any other similar functioning device. Some of the UEs 104 may be referred to as IoT devices (e.g., parking meter, gas pump, toaster, vehicles, heart monitor, etc.). Each UE is able to move about the cellular network system 100 into and out of respective coverages areas (e.g., coverage area 110 and 112).

As noted above, 5G provides for interworking with the existing EPC providing for mobility of UEs between 5G and 4G/LTE networks. Accordingly, 5G provides for service migration by attaching to and from each network as the UE moves into and out of coverage areas. Thus, interworking between the networks allows for migration of attachment between the 5GC and EPC through communication between the UDM 150 and the HSS 140 via a NU1 interface.

For example, as shown in FIG. 1, UE 104a (illustrative depicted as a mobile smartphone) moves from position 114, in coverage area 112, to position 116, out of coverage area 112, as shown by the dotted arrow. If the UE 104a is capable of receiving 5G services, while present in coverage are 112 the UE 104a may be registered with and attached to the AMF 132. Upon moving out of coverage area 112 to the 4G coverage area 110, the UE 104a will attempt to attach to the EPC 120 via a registration request to the MME 122. Once registered and attached to the MME 122, the UE 104a is able to receive 4g/LTE services via EPC 120.

An interworking facilitates the transition between networks to ensure that seamless transition is achieved. For 5G and EPC interworking, there are two solutions: single registration solution and dual registration solution. With the single registration, the UE 104a is permitted to attach to one of the EPC or 5G networks at any point in time. Accordingly, a UE attachment status (e.g., an EPC access registration context) may be exchanged through a control interface between the networks, for example, between the HSS 140 to UDM 150 over a NU1 interface when the attachment status of UE 104a is updated. As used herein, connectivity information may be used to refer to EPC access registration context. With dual registration, the UE 104*a* may be registered to both the EPC or 5GC at any point in time, and thus the EPC access registration context need not be exchanged.

As an illustrative example, FIG. 1 shows the UE 104*a* at position 114, at which point the UE 104*a* is registered with the AMF 132 for receiving 5G services. When the UE 104*a* moves to position 116, the UE 104*a* moves out of the 5G coverage area 112 and needs to attach to the EPC 120 to receive 4G/LTE services. To do so, the UE 104*a* issues a registration request to a mobility management device of the EPC 120 and the mobility management device sends an update location request (ULR) to the HSS 120, via a respective location and service information interface. For example, an Update Location Request is transmitted according to the Diameter Protocol and an Update Location is transmitted according to the MPA protocol. The term "update location request" or "ULR" will be used herein to refer to an Update Location Request sent under the Diameter protocol and/or an Update Location sent under the MAP protocol. The HSS 120 checks subscriber data to confirm the UE 104*a* is permitted to attach to the EPC 120 and other subscription information and, if so, issues an Update Location Answer to the mobility management device. Based on the Update Location Answer the UE 104*a* is registered with and attached to the mobility management device for rendering of 4G/LTE services.

The ULR includes an indicator, for example, bit 8 in the ULR-Flag attributed-value pair (AVP), that notifies the HSS 140 as to whether or not the mobility management device is configured for dual registration. When the mobility management device is not configured for dual registration, this indicator in the ULR is not set. Upon receipt of the ULR from the mobility management device, the HSS 140 transmits a deregistration notification message (e.g., Nudm_UECM_DeregistrationNotification) to UDM 150 which delivers the deregistration notification message to the registered AMF 132 (if any). Receipt of the deregistration notification message triggers the receiving AMF 132 to deregister the UE 104*a* due to mobility from core network 130 to EPC 120. An example of this exchange is illustrated in connection with FIG. 2, below. According to various implementations disclosed herein, if the mobility management device is configured for dual registration, upon receipt of the ULR from the mobility management device, the HSS 140 does not transmit the deregistration notification message since registration with both the EPC 120 and core network 130 is permissible.

Figure 2:
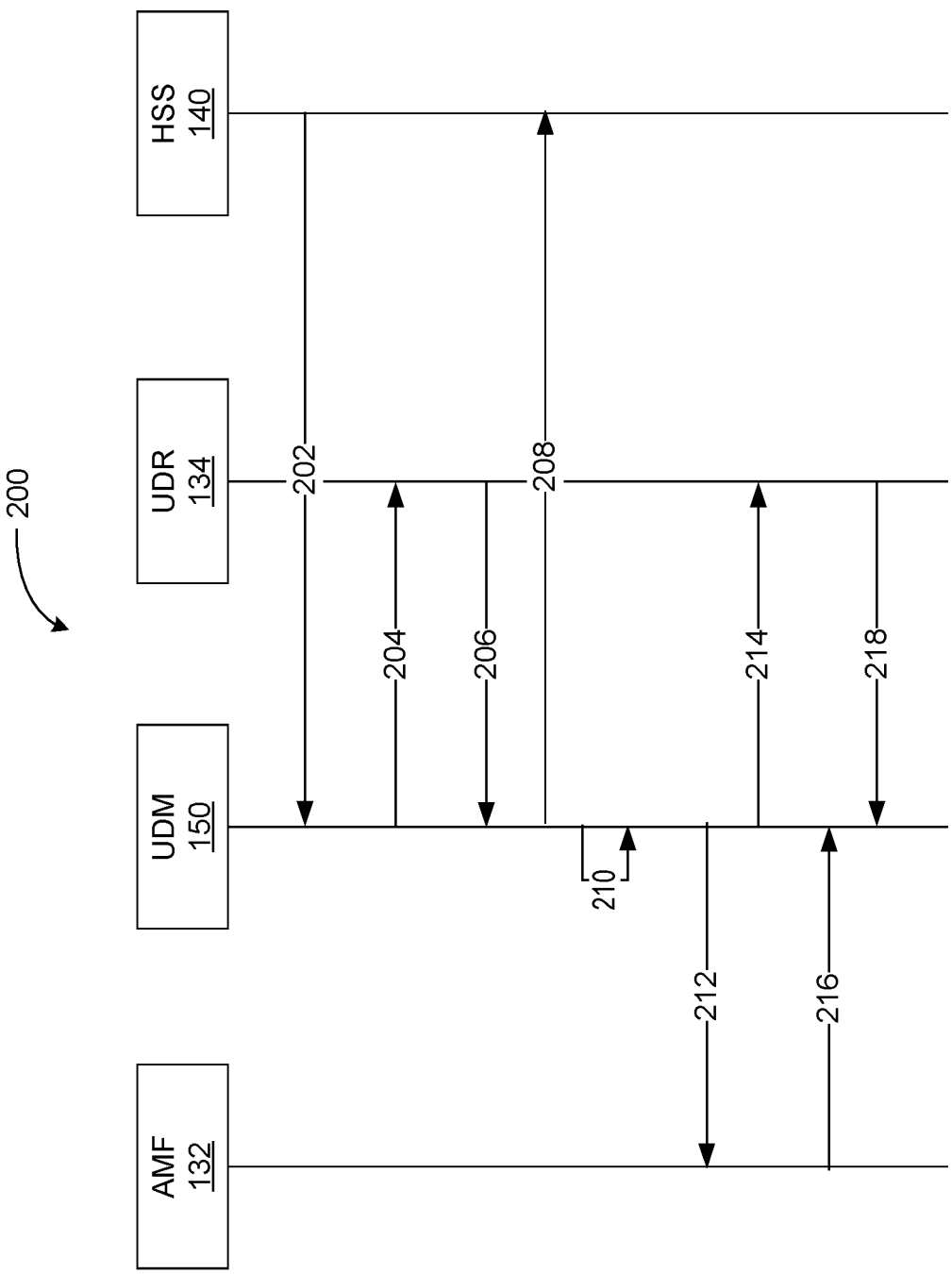
FIG. 2 illustrates an example message flow diagram reflecting operations performed to effectuate deregistration of user equipment from a core network.

FIG. 2 illustrates an example message flow diagram reflecting operations performed to effectuate deregistration of an UE from the core network 120. With reference to FIG. 1 and message flow 200 of FIG. 2, the HSS 140 may transmit a deregistration notification message (also referred to herein as an AMF deregistration notification or request) to the UDM 150 with message 202, for example, over the NU1 interface. The message 202 may also include an identification of the UE (also referred to as "ueId") to be deregistered, for example, a subscription identifier (e.g., an international mobile subscriber identity (IMSI) for the UE). An example AMF deregistration notification may provide as operation "{ueId}/registrations/amf-3gpp-access/dereg-amf" and mapped to HTTP method "POST."

Through message 204 and in response to message 202, the UDM 150 retrieves a current AMF access registration context data stored in the UDR 134 corresponding to the UE identified by message 202. That is, the UDM 150 may use the ueId extracted from message 2020 to retrieve a corresponding AMF access registration context data for the identified UE. For example, the UDM 150 may provide operation "subscription-data/{ueId}/context data/amf-3gpp-access" mapped to HTTP method "GET" to UDR 134. The UDR 134 responds to the UDM 150 with message 206, which includes the requested AMF access registration context data. The UDM 150 may then respond to the HSS 140 with message 208 confirming receipt of message 202, for example, using HTTP status code 204 acknowledging receipt and service response.

At 210, the UDM 150 checks the current AMF access registration context data for a purge flag. The purge flag indicates whether or not the AMF has deregistered the UE. If the purge flag is absent from the AMF access registration context data or set to false (e.g., 0), the UDM 150 forwards the deregistration notification to the AMF 132 with message 212. For example, the UDM 150 uses a callbackReference Uniform Resource Locator (URL) in the AMF access registration context data mapped to HTTP method "POST" to provide the AMF deregistration notification to the AMF 132. Prior to sending message 212, the UDM 150 sets a deregistration reason attribute in the notification to:

"5GS_TO_EPS_MOBILITY_UE_INITIAL_REGISTRATION," in the case that "UE_INITIAL_REGISTRATION" was received in the deregistration notification from the HSS 140; or "5GS_TO_EPS_MOBILITY," in a case that "5GS_TO_EPS_MOBILITY" or an unexpected reason is received in the deregistration notification from the HSS 140.

When "UE_INITIAL_REGISTRATION" is sent by HSS 140, it indicates that the deregistration towards UDM 150 is due to an initial attach in EPC 120. "5GS_TO_EPS_MOBILITY_UE_INITIAL_REGISTRATION" indicates that the deregistration in the AMF 132 is due to an initial attach in the EPC 120. "5GS_TO_EPS_MOBILITY" indicates that the deregistration is due to non-initial attach to the EPC 120.

The UDM 150 also sets the purge flag in the access registration context data to true and updates access registration context data stored the UDR 134 with message 214. For example, the UDM 150 issues message 214 including operation subscription-data/{ueId}/context-data/amf-3gpp-access (purgeFlag) mapped to the HTTP method "PATCH". In another example, the UDM 150 may map the operation to HTTP method "PUT" to replace the data with the updated data. While FIG. 2 illustrates message 212 sent prior to message 214, the temporal relationship of these messages are not limited thereto. Message 212 may be transmitted after or at the same time as message 214. The AMF 132 and UDR 134 may respond with to the UDM 150 confirming completion with message 216 and 218, respectively.

In the case that the UDM 150 determines the purge flag is set to true at 210, the flow does not execute message 212 to 218 since the UE has already been deregistered from the AMF 132. Additionally, message 208 may be transmitted by at any point in the message flow after message 206, for example, after message 218.

In the event that access registration context data does not exist in the UDR 134, the UDM 150 receives an indication of such (e.g., HTTP status code 404/USER_NOT_Found) in message 206 from the UDR 134. The UDM 150 then forwards the indication to the HSS 140 as message 208.

The messages 204-218 of message flow 200 are executed at the core network 130 each time a deregistration notification is received at the UDM 150. Under either the single or dual registration solution, a UE may move between multiple mobility management devices of the EPC, and each change-over could result in a repetitive and unnecessary deregistration notifications receive at the UDM 150. For example, UE 104*a* may migrate from the core network 130 to EPC 120 and register with MME 122. Registration with MME 122 results in a deregistration notification issued to UDM 150 and execution of the message flow 200. Then, at a later point in time, the UE 104*a* may register with one or more of the SGSN 124, S4-SGSN 126, and/or VLR 128, and each registration may result in a corresponding deregistration notification sent from the EPC 120 to core network 130. These subsequent deregistration notifications are repetitive of the first deregistration notification since the AMF 132 as already deregistered the UE 104*a* and cancelled core network 130 services. Each redundant deregistration notification uses computation resources and cycle burns at the core network 130 to process and respond to, thereby consuming resources that could be used for other core network functions.

Implementations disclosed herein provide for systems and methods that optimize the deregistration of UEs from the core network 130, through reduction and avoidance of redundant deregistration notifications. Implementations herein utilize EPC 120 connectivity information (e.g., attachment status on the location and service information interface included in the EPC access registration context) to determine whether or not to inject deregistration notification message traffic into the core network 130. Accordingly, the systems and method disclosed herein avoid unnecessary traffic generation, reduce CPU cycle burn, and avoid burdening the core network 130 via reduction and elimination of redundant message requests.

Figure 3:
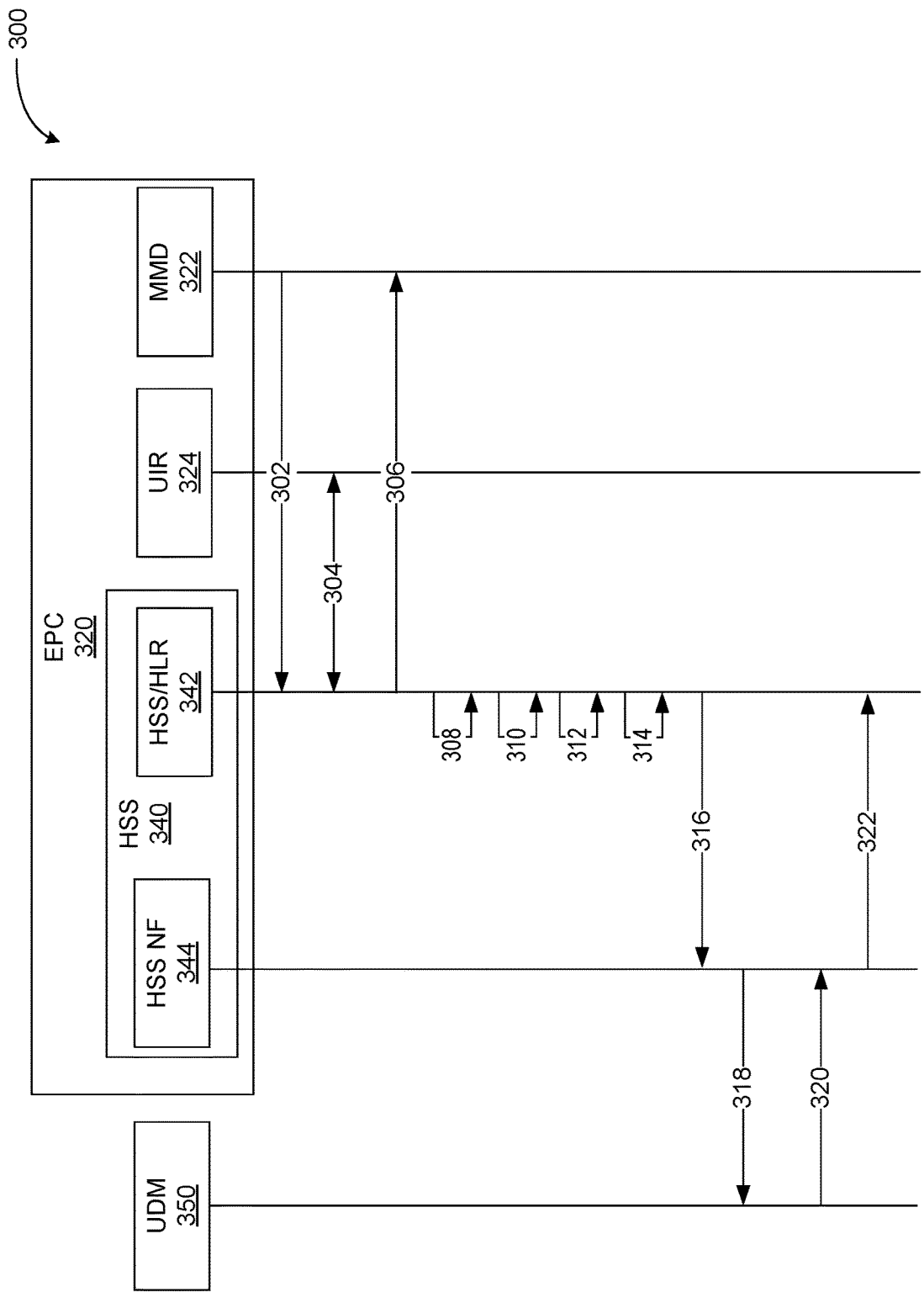
FIG. 3 illustrates an example message flow diagram reflecting operations performed to transmit a deregistration notification to the core network in accordance with the implementations disclosed herein.

FIG. 3 illustrates an example message flow diagram reflecting operations performed to transmit a deregistration notification to core network 130. FIG. 3 illustrates components of a wireless communication system, including an EPC 320 having a mobility management device 322, Universal Identify Repository (UIR) 324, HSS 340, and a UDM 350. Except as provided herein, the EPC 320, HSS 340, and UDM 350 are substantially similar to EPC 120, HSS 140, and UDM 150 of FIG. 1, respectively. In some implementations, the UIR 324 may be included with the HSS 340 or may be remote therefrom and communicably coupled (e.g., via wired or wireless communication). The MMD 322 may be representative of one or more of an MME, SGSN, S4-SGSN, and VLR, which may be substantially similar to MME 122, SGSN 124, S4-SGSN 126, and VLR 128 of FIG. 1, respectively.

Additionally, the HSS 340 comprises various functional entities for performing internal operations of the HSS 340. The functional entities of the HSS 340 may include, but are not limited to, a HSS/HLR 342 and a HSS network function (NF) client gateway 344 (referred to herein as HSS NF 344). The HSS/HLR 342 may be configured to communicate with mobility management devices using the Diameter Protocol and/or MAP protocol. For example, in the case that the MMD 322 is either an MME or an S4-SGSN, the HSS/HLR 342 uses Diameter Protocol to communicate with the MMD 322. In the case that the MMD 322 is either an SGSN or VLR, the HSS/HLR 342 uses MAP protocol to communicate with the MMD 322 (e.g., similar to a legacy HLR). Additionally, the HSS/HLR is configured to convert messages and data included therein from a first protocol (e.g., Diameter Protocol or MAP protocol) to an internal messaging protocol of the HSS 340, which may be a proprietary protocol for internal operations of the HSS 340. The HSS NF 344 is configured to receive messages and data attached thereto from the HSS/HLR 342 according to the internal messaging protocol and repackage these messages and data according to HTTP for communication with the UDM 350. While not shown in FIG. 1 for illustrative purposes, the HSS/HLR 342 and HSS NF 344 may also be included in the HSS 140 of FIG. 1.

Responsive to UE mobility out of a core network coverage area (e.g., UE 104*a* moves out of coverage area 112 to position 116 of FIG. 1) and attempting to attach to MMD 322, the HSS/HLR 342 receives a ULR from the serving MMD 322 as message 302, for example, over a corresponding location and service information interface (e.g., over s6a interface in the case that the MMD 322 is an MME, over s6d interface in the case that the MMD 322 is an S4-SGSN, etc.). The message 302 may be provided according to the protocol corresponding to the location and service information interface of the serving MMD 322 (e.g., Diameter Protocol for MME or S4-SGSN or MAP protocol for SGSN or VLR). The ULR may include or otherwise be accompanied by a ueld of the requesting UE. The HSS/HLR 342 may then check and update EPC subscriber data in the UIR 324 using the ueld at 304 and respond to the serving MMD 322 with an Update Location Answer with message 306 via the corresponding location and service information interface. The subscriber data retrieved at 304 may include connectivity information (e.g., an EPC access registration context for the UE). The connectivity information may include attachment status indicators and capabilities of any currently (if any) attached mobility management devices (e.g., dual registration capabilities to name an example).

At 308, the HSS/HLR 342 determines if core network registration in the EPC subscription data indicates that IP services via a core network (e.g., core network 130 of FIG. 1) is allowed and confirms that the Network Access Mode (NAM) is packet-switching (PS) or circuit switching (CS) plus PS for the UE attempting to register. If core network registration does not indicate IP services are allowed over the core network or if the NAM is not PS or CS plus PS, then the flow ends and the UE is attached. Otherwise, at 310 the HSS/HLR 342 determines if the serving MMD 322 is configured for dual registration. For example, the HSS/HLR 342 checks whether dual registration is set in the ULR received at message 302 (e.g., if bit 8 in the ULR-Flags AVP of the ULR is set or not).

If dual registration is set, the flow ends and the UE is attached. If dual registration is not set, the HSS/HLR 342 checks the connectivity information to determine if the UE is currently registered with another mobility management device, at 312. For example, the connectivity information (e.g., EPC access registration context) of the UE may comprise an attachment status indicator indicative of whether the UE is currently attached to another mobility management device of the 4G/LTE network. For example, the EPC access registration context of the UE may include, for each mobility management device on the EPC, a first value (e.g., 0) if the UE has never attached to the respective mobility management device, a second value (e.g., 1) if the UE is not currently attached to the respective mobility management device, and at least a third value (e.g., 2) if the UE is attached the respective mobility management device. In some implementations, the third value may be indicative that the UE is attached to the Home Public Land Mobile Network (HPLMN), while a fourth value (e.g., 3) may be indicative that the UE is attached to the Visitor Public Land Mobile Network (VPLMN).

In the case that the EPC access registration context indicates the UE is attached to another mobility management device, the HSS/HLR 342 determines if the UE is currently attached to another MME (e.g., the another mobility management device is an MME) at 314. If the UE is currently attached to an MME, at 314 the HSS/HLR 342 determines if the currently attached MME is configured for dual registration. For example, the dual registration capabilities of the currently attached MME may be included in the connectivity information, along with the attachment status. In the case that the currently attached MME is not configured for dual registration, the message flow ends. That is, for example, a deregistration notification was previously delivered to the 5G network based on the current attachment status. In some implementations, the UE may register with and attach to the serving MMD 322. In other implementations, if an initial attach indicator is set in the ULR, the HSS/HLR 342 sends a cancel location to the serving MMD 322.

In view of the above determinations, the HSS/HLR 342 generates an internal AMF deregistration notification message, which is provided to the HSS NF 344 as message 316. That is, an AMF deregistration notification generated under the following criteria: (i) if the serving MMD 322 is not configured for dual registration and there is no current attachment to any other legacy mobility management device; (ii) if the serving MMD 322 is not configured for dual registration and the currently attached MMD 322 is an MME that is configured for dual registration; or (iii) if the serving MMD 322 is a legacy network entity (e.g., a SGSN, S4-SGSN, VLR, etc.) and there is no current attachment to any other mobility management device. Once the AMF deregistration notification is generated, it is provided to the HSS NF 344 with message 316. For example, the HSS/HLR 342 receives the ULR according to a protocol corresponding to the location and service information interface on which message 302 was sent to the HSS/HLR 342 (e.g., Diameter Protocol, MAP protocol, etc.). As described above, the HSS/HLR 342 then repackages data from the ULR and generates an internal AMF deregistration notification message according to the internal messaging protocol of the HSS/HLR 342. The internal AMF deregistration notification may comprise the IMSI of the UE and the notification (e.g., a request) to deregister the identified UE. In the internal AMF deregistration notification, the HSS/HLR 342 sets a deregistration reason as either (a) deregistration is due to an initial attachment in EPC 320 (e.g., sets the deregistration reason as "UE_INITIAL_REGISTRATION") if an initial attach indicator in the ULR is set or (b) deregistration is due non-initial attach in EPC 320 (e.g., sets the deregistration reason as "5GS_TO_EPS_MOBILITY").

The internal AMF deregistration notification included with message 316 is converted from the internal messaging protocol of the HSS 340 into HTTP by the HSS NF 344, thereby generating an AMF deregistration notification. The HSS NF 344 sends the AMF deregistration notification is sent to the UDM 350 with message 318. The AMF deregistration notification of message 318 is packaged with or otherwise combined with a UE identifier, such as the IMSI of the UE or any data containing a mobile subscription identity (MSI).

Upon receipt of message 318, the UDM 350 initiates a message flow to perform AMF deregistration of the UE identified with message 318. Message flow 200 of FIG. 2 may be an example of such the message flow initiated by UDM 350. For example, message 318 may be an example of message 202 of FIG. 2 that initiates the message flow of FIG. 2, where UDM 350 may be illustrative of UDM 150. Subentry, the HSS NF 344 receives an AMF deregistration service response from UDM 350 with message 320, which may be an example of message 208 of the message flow of FIG. 2. The HSS NF 344 delivers the service response to the HSS/HLR 342.

Through the use of the message flow 300, a cellular communication system utilizes EPC connectivity information (e.g., dual registration and attachment status on respective location and service information interface interfaces) to determine whether or not to inject AMF deregistration messages (e.g., message 316) into core network traffic. That is, implementations herein determine whether or not the UE is actually registered with the core network based on EPC connectivity information. Thus, implementations herein are configured to send AMF deregistration messages in instances where the UE is actually attached to the core network and refrain from sending otherwise repetitive and unnecessary AMF deregistration messages. By injecting messages for effectuating an actual deregistration (and not sending messages that are redundant), core network resources and CPU cycles are made available to perform other functions instead of processing repetitive deregistration messages (e.g., instead of executing message flow of FIG. 2 on unnecessary messages). Accordingly, implementations disclosed herein avoid unnecessary traffic generation, reduce CPU cycle burn, and avoid burdening the core network and/or the EPC.

In one example implementation, the other mobility management device of 312 may be implemented as an MME. In this example, the internal AMF deregistration notification is transmitted at message 318 (i) if the ULR is received from an MME (e.g., an example of a serving MMD 322 in FIG. 3) that is not set for dual registration or (ii) if the ULR was received from a legacy device (e.g., a SGSN, S4-SGSN, VLR, etc.) and there is no current MME attachment. Thus, an AMF deregistration notification is not sent where (a) the MMD 322 is an MME configured for dual registration (regardless of prior attachment status) or (b) if the MMD 322 is a legacy network entity and there is currently attachment to another MME. This may result in a scenario in which an internal AMF deregistration notification is generated (and thus message 316 sent) in response to a UE registering with a serving MME, even though the UE is currently attached to another MME. The resulting AMF deregistration notification may be redundant. Similarly, if the UE is currently attached to a legacy network entity and attempts to register on an MME, a redundant AMF deregistration notification may be generated.

In another example implementation, the other mobility management device of 312 may refer to any mobility management devices (e.g., MME or legacy devices). Thus, in this example, the internal AMF deregistration notification is transmitted (i) if the ULR is received from an MME that is not configured for dual registration and there is no current attachment to any other mobility management device; (ii) if the ULR is received from an MME that is not configured for dual registration and the UE is currently attached to another MME that is configured for dual registration; or (iii) if the ULR was received from a legacy network entity (e.g., a SGSN, S4-SGSN, VLR, etc.) and there is no current attachment to any other mobility management device. An AMF deregistration notification may not be sent where (a) the serving MMD 322 is an MME configured for dual registration (regardless of prior attachment status); (b) the serving MMD 322 is not set for dual registration and the UE is currently attached to an MME that is set not set for dual registration; or (c) the serving MMD 322 is not set for dual registration and the UE is currently attached to a legacy mobility management device. In this scenario, AMF deregistration notifications for deregistering the UE from the core network are sent while redundant messages avoided.

Table 1 below depicts various example scenarios or cases of according to the implementations disclosed herein, including the above described examples. In the below examples, each case is initiated by receipt of an ULR from a serving mobility management device (e.g., MMD 322 of FIG. 3), which in each case is an MME.

TABLE 1

| Case | Any other interface attached (D/Gr/S6d, etc.) | Previous S6a attached? | Previous S6a ULR-Flag (Dual Reg indicator)-transient. | New ULR indicates DualReg (via ULR-Flags AVP) | Send DeregAMF ? |
|---|---|---|---|---|---|
| 1 | NO | NO | NO | NO | YES |
| 2 | NO | NO | NO | YES | NO |
| 3 | NO | NO | YES | NO | YES |
| 4 | NO | NO | YES | YES | NO |
| 5 | NO | YES | NO | NO | NO |
| 6 | NO | YES | NO | YES | NO |
| 7 | NO | YES | YES | NO | YES |
| 8 | NO | YES | YES | YES | NO |
| 9 | YES | NO | NO | NO | NO |
| 10 | YES | NO | NO | YES | NO |
| 11 | YES | NO | YES | NO | NO |
| 12 | YES | NO | YES | YES | NO |
| 13 | YES | YES | NO | NO | NO |
| 14 | YES | YES | NO | YES | NO |
| 15 | YES | YES | YES | NO | YES |
| 16 | YES | YES | YES | YES | NO |

In the case that the ULR is received from a legacy mobility management device (as opposed to an MME), implementations herein check whether there is not any attachment to another mobility management device, and, if so, send the AMF deregistration notification.

Figure 4:
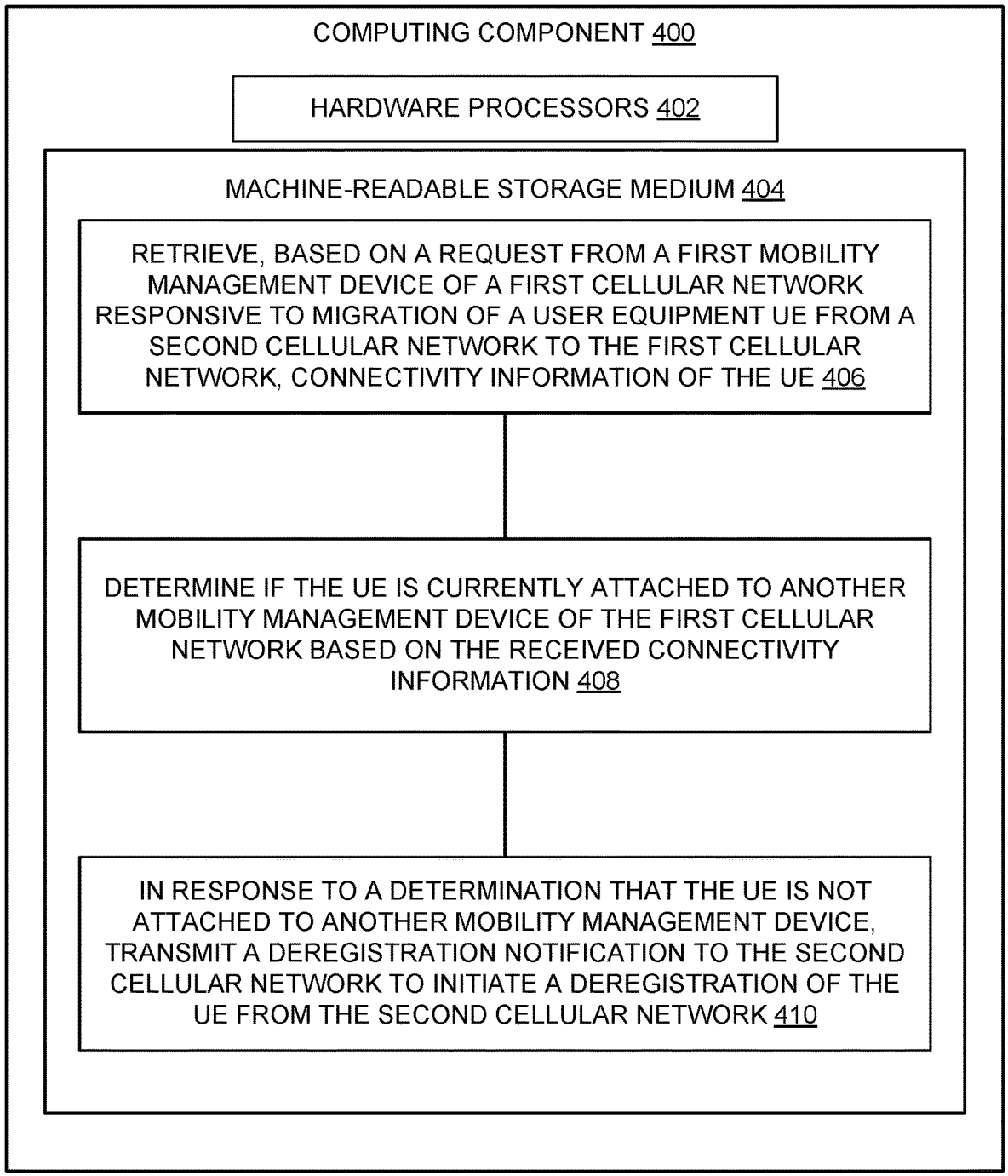
FIG. 4 is an example computing component that may be used to implement various features of user equipment deregistration in accordance with the implementations disclosed herein.

FIG. 4 is an example computing component 400 that may be used to implement various features of the elements, network functions, etc. illustrated in any of FIGS. 1-4 in accordance with one embodiment of the disclosed technology. Computing component 400 may be, for example, a server computer, a controller, or any other similar computing component capable of processing data. In the example implementation of FIG. 4, the computing component 400 includes a hardware processor 402, and machine-readable storage medium 404.

Hardware processor 402 may be one or more central processing units (CPUs), semiconductor-based microprocessors, and/or other hardware devices suitable for retrieval and execution of instructions stored in machine-readable storage medium 404. Hardware processor 402 may fetch, decode, and execute instructions, such as instructions 406-412, to control processes or operations for determining UE slice accessibility. As an alternative or in addition to retrieving and executing instructions, hardware processor 402 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 404, may be any electronic, magnetic, optical, or other physical storage device that contains or stores executable instructions. Thus, machine-readable storage medium 404 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 404 may be a non-transitory storage medium, where the term "non-transitory" does not encompass transitory propagating signals. As described in detail below, machine-readable storage medium 404 may be encoded with executable instructions, for example, instructions 406-412.

Hardware processor 402 may execute instruction 406 to retrieve, based on a request from a first mobility management device of a first cellular network responsive to migration of a UE from a second cellular network to the first cellular network, connectivity information of the UE. For example, the first cellular network may be a 4G/LTE network comprising an EPC and the second cellular network may be a 5G network including the 5GC, as set forth above. As the UE moves out of the second cellular network, the UE attempts to attach to the first cellular network, which causes a first mobility management device (e.g., one of a MME, S4-SGSN, SGSN, or VLR) to issue an Update Location Request, for example, to an HSS of the EPC, as discussed in connection with FIG. 3. Based on this request, processor 402 may execute instructions 406 to retrieve connectivity information, such as attachment status.

Hardware processor 402 may execute instruction 408 to determine if the UE is currently attached to another mobility management device of the first cellular network based on the received connectivity information. As described above in connection with FIG. 3, connectivity information may include attachment status accessed, for example, from the EPC access registration context data for the UE. From this data, processor 402 may execute instructions 408 to determine if the UE is currently attached to a mobility management device distinct from the first mobility management device.

Hardware processor 402 may execute instruction 410 to, in response to a determination at instruction 408 that the UE is not attached to another mobility management device, transmit a deregistration notification to the second cellular network to initiate a deregistration of the UE from the second cellular network. As discussed above in connection with FIG. 3, in the case that the determination at instruction 408 is that the UE is not currently attached to another mobility management device, an AMF deregistration notification message is transmitted from the HSS of the EPC to a UDM of the 5GC. The UDM then forwards this message, as discussed above in connection with FIG. 2, to the AMF of the 5GC, which deregisters the UE from the 5GC and cancels 5G services. In the case that the determination at instruction 408 is that the UE is currently attached to another mobility management device, an AMF deregistration notification message is not transmitted, thereby avoiding injecting redundant message traffic into the 5G network and optimizing the deregistration process. In various implementations, transmission of the deregistration notification is based on whether or not the first mobility management device is configured for dual registration. Additionally, in some embodiments, the transmission may also be dependent on whether or not the another mobility management device is configured for dual registration.

Figure 5:
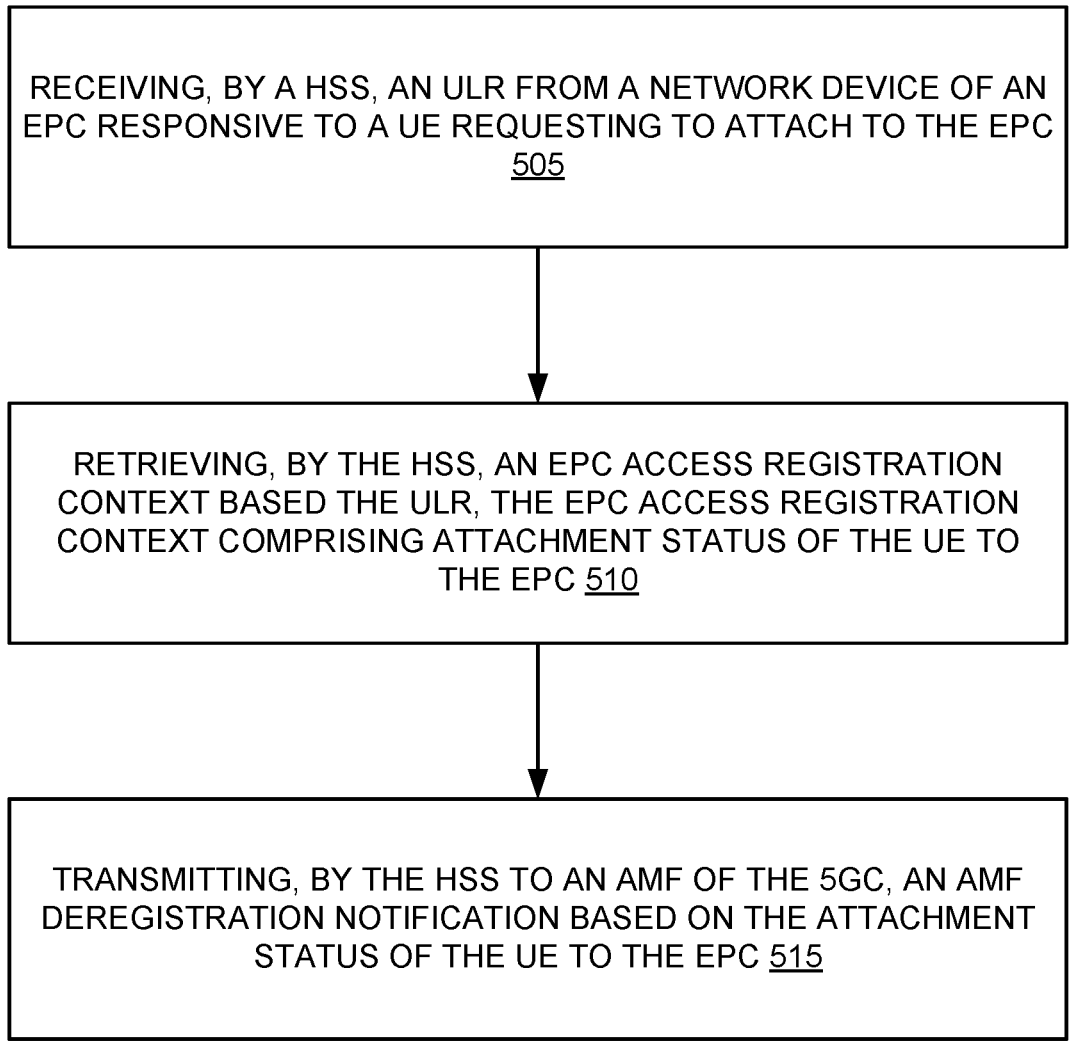
FIG. 5 is an example flow chart illustrating example operations for transmitting a deregistration notification to the core network in accordance with the implementations disclosed herein.

FIG. 5 is an example flow chart illustrating example operations for transmitting a deregistration notification to the core network in accordance with the implementations disclosed herein. In this example, the process may be performed by one or more of the NFs of the EPC and/or 5GC described herein. The NFs may be implemented as, for example, a server computer, a controller, or any other similar computing component capable of processing data, an example of which is described above in connection with FIG. 4. The flow chart of FIG. 5 may be stored as a set of instructions in a machine-readable storage medium that, when executed by a processor, cause the processor to perform the flow chart.

At block 505, an ULR is received, by an HSS, from a network device of an EPC responsive to a UE requesting to attach to the EPC. For example, as described above, a mobility management device may provide a ULR to the HSS based on a UE attempting to attach to the mobility management device.

At block 510, an EPC access registration context is retrieved, by the HSS, based the received ULR. The EPC access registration context comprises attachment status of the UE to the EPC. For example, the EPC access registration context may include an indication of whether or not the UE is currently attached to a mobility management device of the EPC.

At block 515, an AMF deregistration notification is transmitted, by the HSS to an AMF of the 5GC, based on the attachment status of the UE to the EPC. For example, in some implementations, if the EU context indicates that the UE is not currently attached to any mobility management device on the EPC, then an AMF deregistration notification may be sent to the AMF via a UDM, as described above in connection with FIG. 3. In some implementations, transmission of an AMF deregistration notification is based on whether or not the network device is configured for dual registration with a 5GC. In other implementations, alone or in combination with the preceding implementations, in a case where the UE is currently attached to the EPC, transmission of an AMF deregistration notification may be based on whether or not the current attachment permits dual registration with the 5GC.

Computing components and devices, such as computing component 400, may include a main memory, such as a RAM, cache and/or other dynamic storage devices, coupled to a bus for storing information and instructions to be executed by a processor of the computing component or devices. The main memory also may be used for storing temporary variables or other intermediate information during execution of instructions to be executed by the processor, for example, as described above in connection with FIG. 4. Such instructions, when stored in storage media accessible to the processor, render computer component into a special-purpose machine that is customized to perform the operations specified in the instructions.

The computing components and devices may further include a read only memory (ROM) or other static storage device coupled to the bus for storing static information and instructions for the processor. A storage device, such as a magnetic disk, optical disk, or USB thumb drive (Flash drive), etc., may be provided and coupled to the bus for storing information and instructions.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computing components and devices may implement the techniques described herein using customized hard-wired logic, one or more ASICs or FPGAs, firmware and/or program logic which in combination with the computing component causes or programs the computing component to be a special-purpose machine. According to one embodiment, the techniques herein are performed by the computing components and devices in response to processor(s) executing one or more sequences of one or more instructions contained in the main memory. Such instructions may be read into the main memory from another storage medium. Execution of the sequences of instructions contained in the main memory causes the processor(s) to perform the process steps described herein, such as the processes described in connection with FIGS. 2-5. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks. Volatile media includes dynamic memory, such as the main memory. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise the bus. Transmission media can also take the form of acoustic or light waves, such as those generated during radio-wave and infra-red data communications.

The computing components and devices may also include a network interface coupled to the bus. The network interface provides a two-way data communication coupling to one or more network links that are connected to one or more local networks. For example, the network interface may be an integrated services digital network (ISDN) card, cable modem, satellite modem, or a modem to provide a data communication connection to a corresponding type of telephone line. As another example, the network interface may be a local area network (LAN) card to provide a data communication connection to a compatible LAN (or WAN component to communicated with a WAN). Wireless links may also be implemented. In any such implementation, the network interface sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through the network interface, which carry the digital data to and from computing components and devices, are example forms of transmission media.

The computing components and devices can send messages and receive data, including program code, through the network(s), network link and the network interface. In the Internet example, a server might transmit a requested code for an application program through the Internet, the ISP, the local network and the network interface.

The received code may be executed by the processor as it is received, and/or stored in the storage device, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system comprising:
a processor; and
a memory operatively connected to the processor and including computer code that, when executed, causes the processor to:
retrieve, based on a request from a first mobility management device of a first cellular network responsive to migration of a user equipment (UE) from a second cellular network to the first cellular network, connectivity information of the UE;
determine if the UE is currently attached to another mobility management device of the first cellular network based on the received connectivity information;
in response to a determination that the UE is not attached to another mobility management device, transmit a deregistration notification to the second cellular network to initiate a deregistration of the UE from the second cellular network.

2. The system of claim 1, wherein a deregistration notification is not transmitted based on a determination that the UE is attached to another mobility management device prior to receiving the connectivity information.

3. The system of claim 1, wherein the computer code, when executed, causes the processor to:
determine if the first mobility management device is configured to accept dual registration with the second cellular network; and
in response to a determination that the first mobility management device is not configured to accept dual registration with the second cellular network, transmit a deregistration notification to the second cellular network to initiate a deregistration of the UE from the second cellular network.

4. The system of claim 3, wherein a deregistration notification is not transmitted based on a determination that the first mobility management device is set for dual registration.

5. The system of claim 1, wherein the computer code, when executed, causes the processor to:
- in response to a determination that the UE is attached to another mobility management device:
  - determine if the another mobility management device is configured to accept dual registration with the second cellular network; and
  - in response to a determination that the another mobility management device is configured to accept dual registration with the second cellular network, transmit a deregistration notification to the second cellular network to initiate a deregistration of the UE from the second cellular network.

6. The system of claim 1, wherein the first cellular network is a 4G/LTE network and the second cellular network is a 5$^{th}$ generation (5G) cellular network.

7. The system of claim 6, further comprising a Home Subscriber Server (HSS) configured to receive the connectivity information from the first mobility management device.

8. The system of claim 7, wherein the first mobility management device is one of a mobility management entity (MME), a Serving General Packet Radio Service (GPRS) Support Node (SGSN), a S4-SGSN, and a Visitor Location Register.

9. The system of claim 8, wherein the computer code, when executed, causes the processor to:
- receive, by the HSS, an Update Location Request (ULR) in response to the moving out of a coverage area of the 5G cellular network via one of a s6a interface when the first mobility management device is the MME, s6d interface when the mobility management device is the S4-SGSN, Gr interface when the mobility management device is the network apparatus is the SGSN, and D interface when the mobility management device is a VLR.

10. The system of claim 9, wherein the computer code, when executed, causes the processor to:
- retrieve Evolved Packet Core (EPC) access registration context based on the received ULR, wherein the EPC access registration context comprises the connectivity information.

11. The system of claim 6, wherein the second mobility management device is one of a mobility management entity, a Serving General Packet Radio Service (GPRS) Support Node (SGSN), and a Visitor Location Register.

12. The system of claim 6, wherein:
- the deregistration notification is transmitted to a Unified Data Manager (UDM) of the 5G cellular network, and
- the UDM causes a Core Access and Mobility Management Function (AMF) of the 5G cellular network to deregister the UE from the 5G cellular network:
  - in response to a determination that the UE is not attached to another mobility management device, transmit a deregistration notification to the second cellular network to initiate a deregistration of the UE from the second cellular network.

13. A method comprising:
- receiving, by a Home Subscriber Server (HSS), an update location request (ULR) from a network device of an Evolve Packet Core (EPC) responsive to a user equipment (UE) requesting to attach to the EPC;
- retrieving, by the HSS, an EPC access registration context based the ULR, the EPC access registration context comprising attachment status of the UE to the EPC;
- transmitting, by the HSS to an Access and Mobility Management Function (AMF) of the 5GC, an AMF deregistration notification based on the attachment status of the UE to the EPC.

14. The method of claim 13, wherein the network device is a Mobility Management Entity (MME), the method further comprising:
- determining, by the HSS, that the MME is not set for dual registration with a 5G core network (5GC) based on the ULR,
- wherein the transmission of the AMF deregistration notification is based on the determination that the MME is not set for dual registration.

15. The method of claim 14, further comprising:
- determining, by the HSS, that the UE is not attached to another MME, a Serving General Packet Radio Service (GPRS) Support Node (SGSN), a S4-SGSN, or a Visitor Location Register (VLR) based on the attachment status of the EPC access registration context,
- wherein the transmission of the AMF deregistration notification to the AMF is based on the determination that the UE is not attached to another MME, a SGSN, S4-SGSN, or VLR of the EPC.

16. The method of claim 14, further comprising:
- determining, by the HSS, that the UE is attached to another MME based on the attachment status of the EPC access registration context; and
- determining, by the HSS, that the another MME is set for dual registration with the 5GC,
- wherein the transmission of the AMF deregistration notification to the AMF is based on the determination that the another MME is set for dual registration.

17. The method of claim 13, wherein the network device is one of a Serving General Packet Radio Service (GPRS) Support Node (SGSN), a S4-SGSN, and a Visitor Location Register (VLR), the method further comprising:
- determining, by the HSS, that the UE is not attached to a Mobility Management Entity (MME) of the EPC based on the attachment status of the EPC access registration context,
- wherein the transmission of the AMF deregistration notification to the AMF is based on the determination that the UE is not attached to a MME of the EPC.

18. A network apparatus comprising:
- a processor; and
- a memory operatively connected to the processor and including computer code that, when executed, causes the processor to:
  - in response to a user equipment (UE) registration request based on UE mobility from a 5G core network to an Evolved Packet Core (EPC), accessing an EPC registration context to determine an attachment status of the UE with mobility management devices of the EPC;
  - based on the attachment status of the UE with mobility management devices of the EPC, generate an Access and Mobility Management Function (AMF) deregistration notification; and
  - transmit the AMF deregistration notification to the 5GC, wherein an AMF of the 5GC deregisters the UE in response to the AMF deregistration notification.

19. The network apparatus of claim 18, wherein the computer code, when executed, causes the processor to:
- determine if the UE registration request indicates that dual registration permissible, wherein transmission of the AMF deregistration notification is based on the determination.

20. The network apparatus of claim 18, wherein the computer code, when executed, causes the processor to:
  determine the UE is attached to a mobility management device of the EPC that is set for dual registration with the 5GC based on the attachment status;
  wherein transmission of the AMF deregistration notification is based on the determination.

\* \* \* \* \*